United States Patent
Vandenhoudt et al.

(10) Patent No.: US 7,339,944 B2
(45) Date of Patent: Mar. 4, 2008

(54) DISTRIBUTED SHARED MEMORY PACKET SWITCH

(75) Inventors: Jan Vandenhoudt, Turnhout (BE); Alan Mimms, Spokane, WA (US)

(73) Assignee: Alcatel Lucent, Paris (FR)

( * ) Notice: Subject to any disclaimer, the term of this patent is extended or adjusted under 35 U.S.C. 154(b) by 987 days.

(21) Appl. No.: 10/147,279

(22) Filed: May 15, 2002

(65) Prior Publication Data

US 2003/0002509 A1    Jan. 2, 2003

Related U.S. Application Data

(60) Provisional application No. 60/291,284, filed on May 17, 2001.

(51) Int. Cl.
*H04L 12/28* (2006.01)
(52) U.S. Cl. .................. 370/419; 370/413; 370/386
(58) Field of Classification Search ................ 370/413, 370/376, 395.71
See application file for complete search history.

(56) References Cited

U.S. PATENT DOCUMENTS

| | | |
|---|---|---|
| 5,214,639 A | 5/1993 | Herion |
| 5,475,679 A | 12/1995 | Munter |
| 5,535,197 A | 7/1996 | Cotton |
| 5,548,590 A | 8/1996 | Grant et al. |
| 5,634,011 A | 5/1997 | Auerbach et al. |
| 5,813,043 A | 9/1998 | Iles et al. |
| 5,974,467 A | 10/1999 | Haddock et al. |
| 6,023,471 A | 2/2000 | Haddock et al. |
| 6,173,425 B1 | 1/2001 | Knaack et al. |
| 6,189,073 B1 | 2/2001 | Pawlowski |
| 6,216,167 B1 | 4/2001 | Momirov |
| 6,347,234 B1* | 2/2002 | Scherzer .................. 455/562.1 |
| 6,434,115 B1* | 8/2002 | Schwartz et al. ............ 370/235 |
| 6,781,984 B1* | 8/2004 | Adam et al. ................. 370/360 |

FOREIGN PATENT DOCUMENTS

EP    0 374 337 A1    6/1990

OTHER PUBLICATIONS

Semeria, Chuck, "Internet Backbone Routers and Evolving Internet Design," Sep. 24, 1999, pp. 1-19, Juniper Networks, Mountain View, CA., USA.
U.S. Appl. No. 10/180,279, filed Jun. 26, 2002, Van Hoff.
U.S. Appl. No. 10/188,255, filed Jul. 1, 2002, Van Hoff.
International Search Report dated Sep. 12, 2002.

* cited by examiner

*Primary Examiner*—Bob A. Phunkulh
(74) *Attorney, Agent, or Firm*—Craig A. Hoersten; Bobby D. Slaton (57) ABSTRACT

A shared memory packet switch fabric whose scheduling task is distributed to multiple egress schedulers residing on multiple egress control units and whose data storage is distributed to multiple packet buffer units, where the schedulers and the packet buffer units are interconnected via high speed links. An ingress control unit receives and transmits a packet to one of a plurality of packet buffer units (PBUs) making up the switch fabric. The receiving PBU stores the packet in memory and transmits a notification message with the memory information to all interested egress control units. If an egress control unit receiving the notification has enough queue space, it stores the memory information in its queue. The egress control unit then transmits a booking message indicating that it is to request the packet in the future. When the packet is to be scheduled for forwarding according to a scheduling algorithm run by the egress control unit, the egress control unit transmits a request message for retrieving the packet from the PBU.

20 Claims, 10 Drawing Sheets

| PBN ENTRY NUMBER | BOOKING BITS | | | | | PBN ADDRESS |
| --- | --- | --- | --- | --- | --- | --- |
| | ECU1 | ECU2 | ECU3 | ... | ECUM | |
| 1 | 0 | 1 | 0 | ... | 0 | 00001000 |
| 2 | 0 | 0 | 1 | ... | 1 | 00000080 |
| 3 | 0 | 1 | 0 | ... | 0 | 18C00100 |
| 4 | 1 | 1 | 1 | ... | 0 | 18C000C0 |
| ... | | | | | | ... |

FIG. 5

| FGRP NUMBER | SUBSCRIPTION BITS | | | | |
| --- | --- | --- | --- | --- | --- |
| | ECU1 | ECU2 | ECU3 | ... | ECUM |
| 10 | 0 | 1 | 0 | ... | 0 |
| 14 | 0 | 0 | 1 | ... | 0 |
| 22 | 1 | 1 | 0 | ... | 0 |
| ... | | | | | |

DISTRIBUTED SHARED MEMORY PACKET SWITCH

CROSS-REFERENCE TO RELATED APPLICATION(S)

This application claims the benefit of U.S. provisional application No. 60/291,284 filed on May 17, 2001, the content of which is incorporated herein by reference.

FIELD OF THE INVENTION

This invention relates generally to packet switching systems, and more particularly, to a shared memory switch fabric whose scheduling is distributed to multiple egress schedulers.

BACKGROUND OF THE INVENTION

A switch fabric in a data communications switch facilitates the transport of data packets received from an ingress port to an egress port for forwarding the packet to a destination. The switch fabric may be implemented as a crossbar switch, cell switch, or shared memory packet switch. One advantage of the shared memory packet switch when compared to other types of switch fabrics is its robustness under high traffic loads. Shared memory packet switches generally provide for lower packet loss and lower latency than other types of switch fabrics.

Shared memory packet switches, however, utilize a single central logic that makes scheduling decisions for all packets destined for all egress ports. As fabric size increases, this also increases the burden on the central logic. Thus, shared memory packet switches often suffer from a lack of scalability beyond a data rate 100 Gbit/sec. In addition, the number of electrical interfaces needed to support the bandwidth for a larger system discourages the larger switch fabric size.

Although crossbar fabrics, cell fabrics, or other switch fabrics implementing a virtual output queue (VOQ) scheduling may be scaled beyond the size of shared memory packet switches, they suffer from lack of robustness and are also susceptible to head of line blockage during high traffic loads. In addition, although switch fabrics implementing VOQ scheduling distribute the scheduling task to various ingress schedulers instead of relying on a single central scheduler, they suffer from the disadvantage that each ingress port must maintain its own set of egress queues for each egress port, magnifying the number of queues that need to be created and maintained.

Accordingly, there is a need for a switch fabric that is easily scalable without compromising its robustness under high traffic loads.

SUMMARY OF THE INVENTION

The present invention is directed to a shared memory packet switch fabric whose scheduling task is distributed to multiple egress schedulers residing on multiple egress control units. The switch fabric includes a number of switch and data storage devices where each device manages a fraction of the traffic.

According to one embodiment, a packet switching system includes a plurality of ingress control units, a plurality of egress control units, and a switch fabric coupled to the plurality of ingress control units and the plurality of egress control units. The switch fabric is used to store packets received by the plurality of ingress control units, and each egress control unit identifies and requests from the switch fabric a packet destined for the egress control unit according to its respective scheduling algorithm. The switch fabric retrieves and transmits the requested packet to the requesting egress control unit for forwarding the packet to a destination.

According to another embodiment, the switch fabric transmits a notification message to one or more egress control units and each of the receiving egress control units determines, based on a filling level of its respective queue, whether to discard the notification message or store in the queue the memory information included in the notification message. The egress control unit storing the memory information in its respective queue transmits to the switch fabric a booking message for indicating that it is to request the stored packet in the future.

The egress control unit storing the memory information in its respective queue transmits to the switch fabric a request message to retrieve the stored packet. The switch fabric receiving the request message retrieves and transmits the requested packet. When no further requests for the packet are anticipated, the memory location associated with the stored packet is freed.

It should be appreciated, therefore, that the present invention avoids the need to burden a single centralized scheduling logic with an increased switch fabric size. The distribution of the scheduling task to multiple egress control units that identify and request from the switch fabric a packet according to their scheduling algorithm eliminates such a burden and allows the switch fabric to be easily scalable. In addition, implementing the switch fabric as a shared memory switch fabric allows the switching system to take advantage of the robustness offered by such shared memory switch fabrics.

BRIEF DESCRIPTION OF THE DRAWINGS

These and other features, aspects and advantages of the present invention will be more fully understood when considered with respect to the following detailed description, appended claims, and accompanying drawings where:

DETAILED DESCRIPTION

Figure 1:
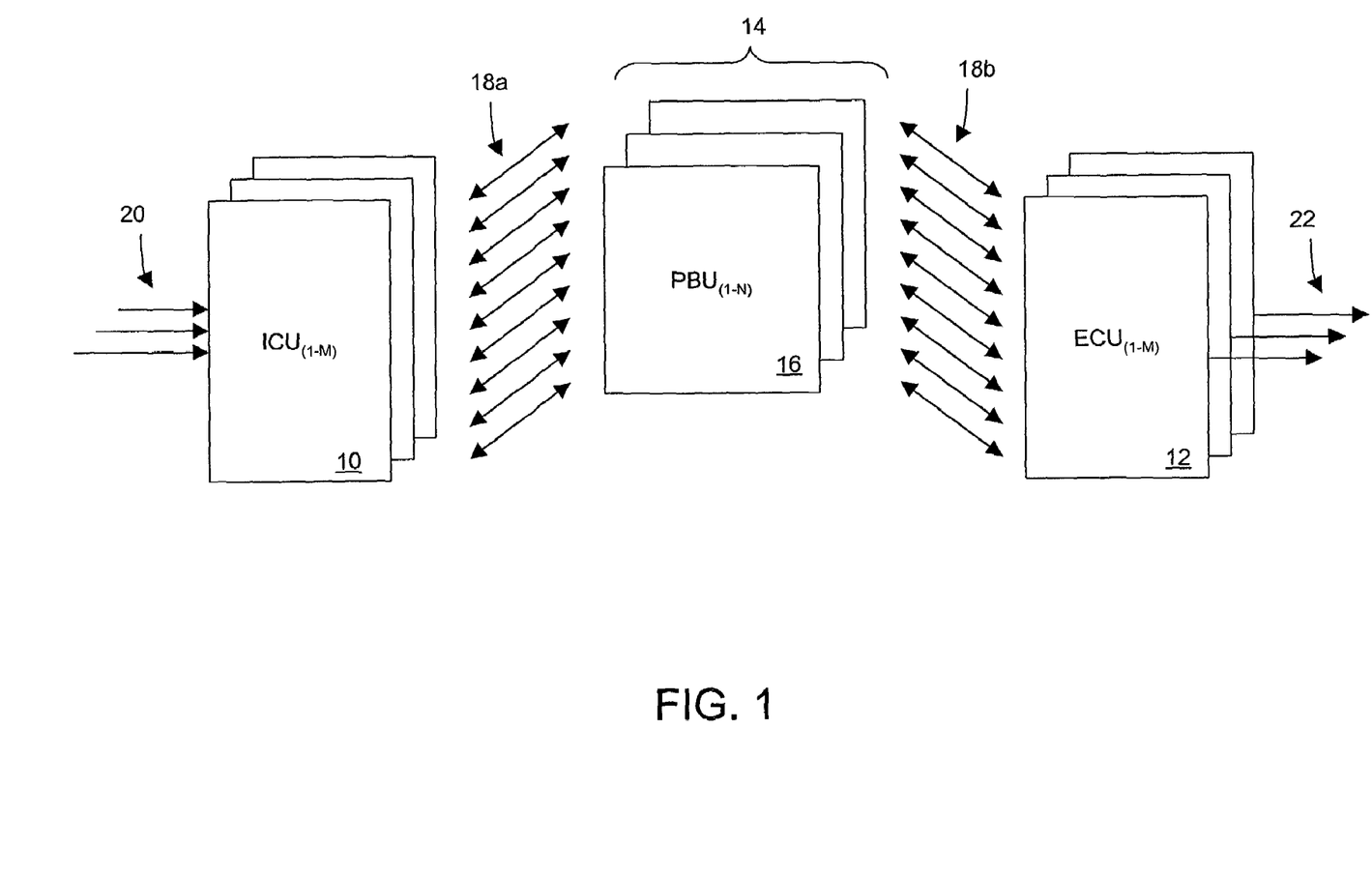
FIG. 1 is a schematic block diagram of a packet switching system having M ingress control units, N packet buffer units, and M egress control units according to one embodiment of the invention.

FIG. 1 is a schematic block diagram of a packet switching system according to one embodiment of the invention. The system includes M ingress control units (ICUs) 10 and M egress control units (ECUs) 12 coupled to a switch fabric 14 via high speed serial links 18a, 18b. The switch fabric 14 is made up of N packet buffer units (PBUs) 16 storing and forwarding packets received from one or more ICUs 10.

Each ICU 10 may have one or more associated input ports 20 and each ECU may have one or more associated output ports 22. In addition, each ICU and ECU includes a link 18a, 18b to each PBU 16 so that each ICU and ECU may communicate with each PBU. According to one embodiment, the input/output ports 20, 22 for each ICU/ECU 10, 12 together transmit at a total data rate of 10 Gbit/sec, and each link 18a, 18b transmits at a data rate of 1 Gbit/sec.

At any given time, all or a subset of the ICUs 10 receive data packets which are destined for all or a subset of the output ports 22. The packets may include, but are not limited to Ethernet frames, ATM cells, TCP/IP and/or UDP/IP packets, and may also include other Layer 2 (Data link/MAC Layer), Layer 3 (Network layer), or Layer 4 (Transport Layer) data units. Upon receipt of a packet by an ICU, the ICU forwards the packet to a PBU for storing. The PBU stores the packet in memory and transmits a notification to all ECUs that may be interested in receiving the packet. If a receiving ECU has enough space in its appropriate queue, it queues a reference to a memory address that may be used to retrieve the packet from the PBU, and transmits an indication to the PBU, referred to as a booking message, that the reference to the address has been queued. The booking message prompts the PBU to keep the packet in memory until requested by all of the booking ECUs, after which the memory is freed up.

When it is time to forward the packet to its destination, the ECUs that have booked the packet transmit a request to the PBU 16 to retrieve the packet. The PBU retrieves the packet and transmits it to the requesting ECUs which forward the packet via one or more associated egress ports.

Figure 2:
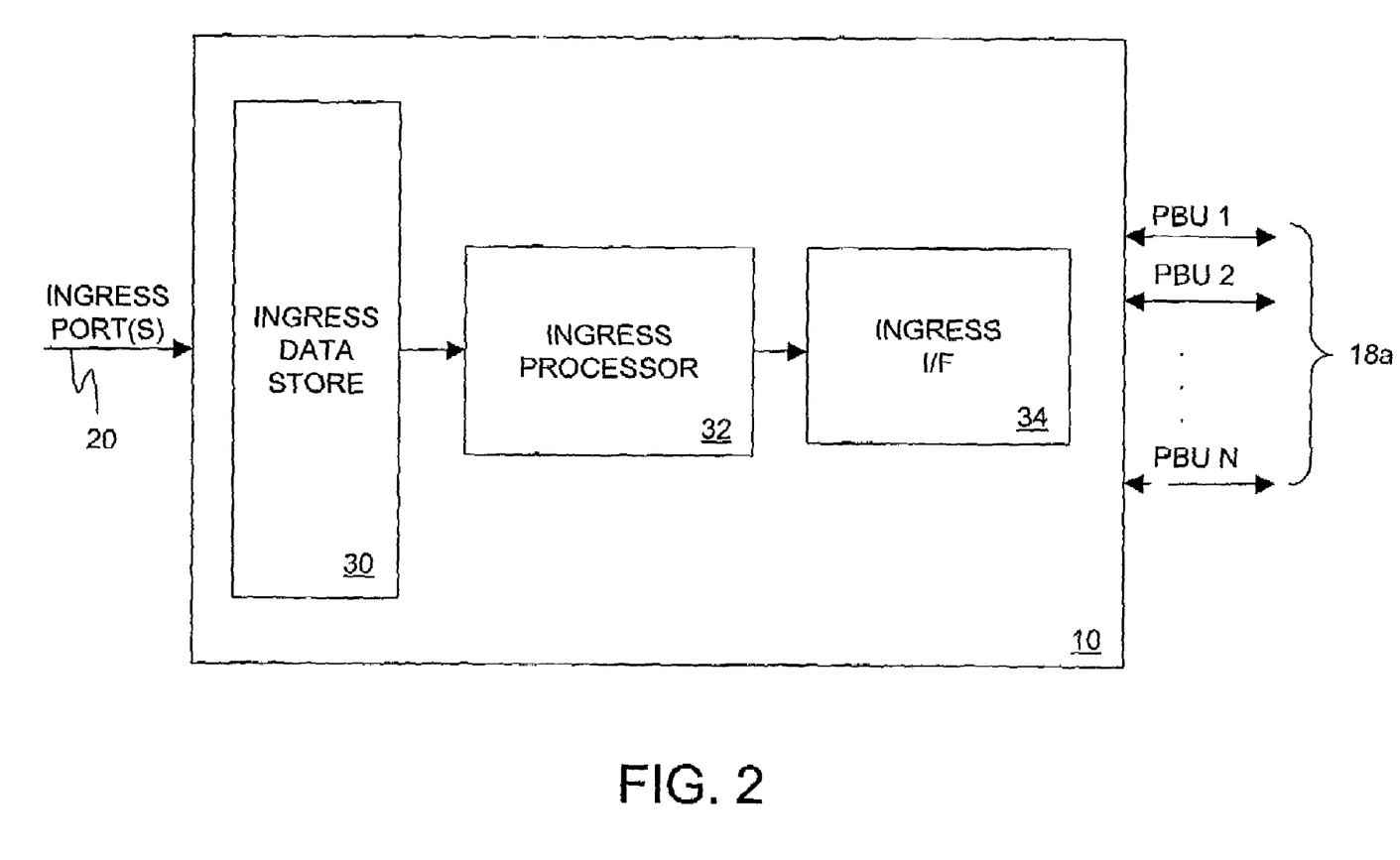
FIG. 2 is a schematic block diagram of an exemplary ingress control unit according to one embodiment of the invention.

FIG. 2 is a schematic block diagram of an exemplary ICU 10 according to one embodiment of the invention. The ICU in the illustrated embodiment includes an ingress data store 30 which is coupled to an ingress processor 32 which is in turn coupled to an ingress interface 34. The ingress data store 30 may be a first-in-first-out (FIFO) buffer for receiving and temporarily storing inbound data packets The ingress data store 30 may be desirable if the data rate of one or more of the ingress ports 20 is lower or higher than the data rate of the high speed serial links 18a to the PBUs. An embodiment may exist, however, where the ICU 10 does not include an ingress data store 30.

The ingress packet processor 32 performs policing, accounting, forwarding, and any other packet processing task for the packet as is conventional in the art. In addition, the ingress packet processor 32 attaches a notification tag to the packet and selects a PBU 16 in the switch fabric that is to receive and store the packet. According to one embodiment of the invention, each link 18a from the ICU 10 to the PBU 16 is associated with a weight that is dynamically updated based on the load or filling level of its associated PBU. The ingress packet processor 32 selects a link 18a, and hence, an associated PBU, based on a pseudo random algorithm adjusted by the weight information, helping the workload to be balanced among the various PBUs. The packet with the appended notification tag is then transmitted on the selected link via the ingress interface 34 for storing in the selected PBU. Updates on the load of the various PBUs may be received via the high speed serial links 18a or via a separate low speed serial control link (not shown).

Figure 3:
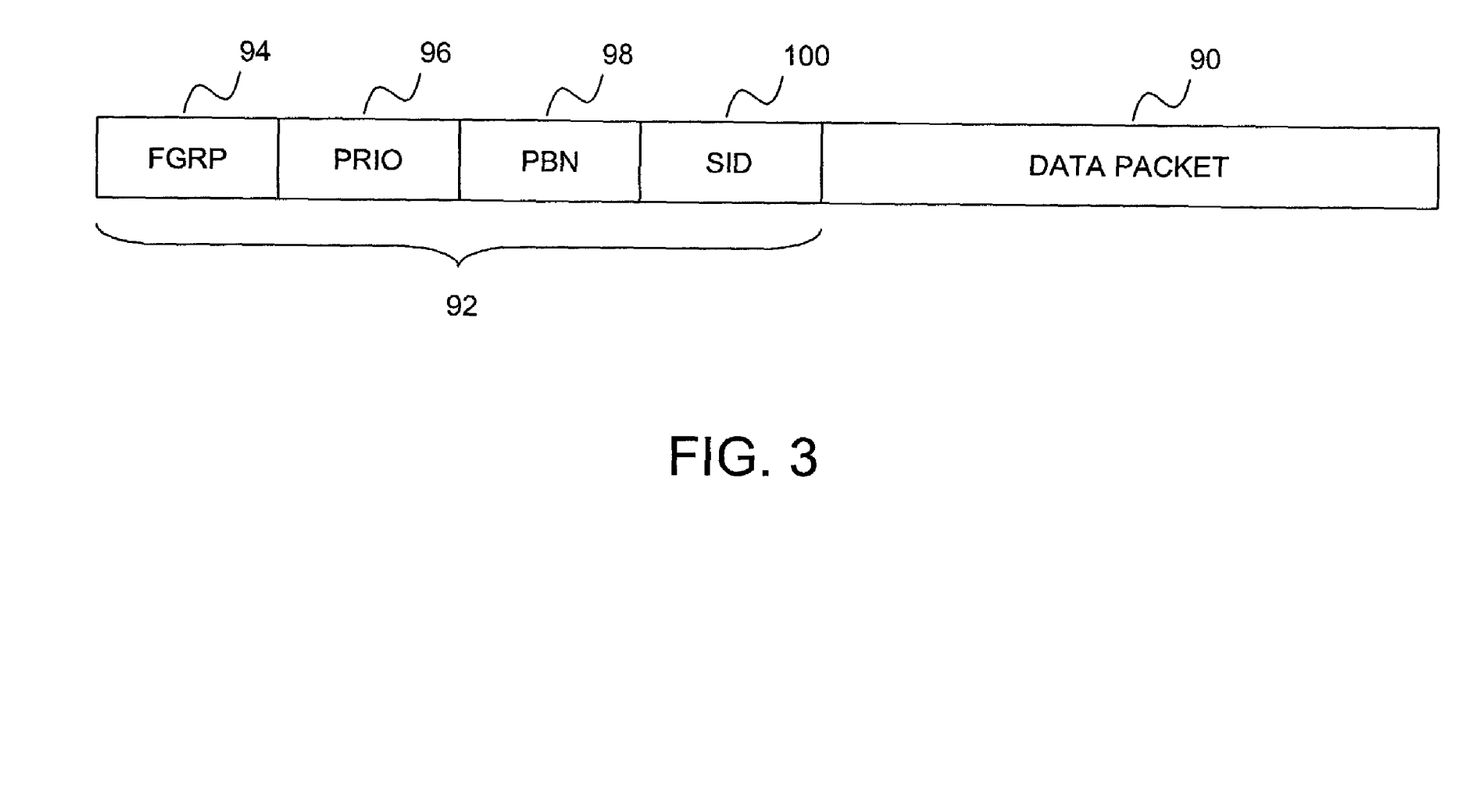
FIG. 3 is a schematic layout diagram of a data packet including a notification tag that is generated by the ingress control unit of FIG. 2 according to one embodiment of the invention.

FIG. 3 is a schematic layout diagram of a data packet 90 including a notification tag 92 that is generated by the ingress processor 32 according to one embodiment of the invention. In an alternative embodiment, the notification tag is generated by a network processor prior to forwarding the packet to the ICU 10.

According to the embodiment illustrated in FIG. 3, the notification tag includes a flow group field 94, priority field 96, packet buffer number (PBN) field 98, and an optional source identifier (SID) 100.

The flow group field 94 includes a flow group number indicative of a flow group associated with the packet. According to one embodiment of the invention, a flow group includes a list of ECUs that have subscribed to the flow group. An ECU subscribes to a flow group if one or more of its egress ports belong to the flow group. A port is associated with a flow group upon its initiation, either via hardware or software, and such information included in a forwarding table that is consulted at ingress for determining the egress ports for the packet.

The priority field 94 indicates a differentiated services codepoint (DCSP) value indicating a type of quality of service (QoS) to be rendered to the packet. This information may be obtained from the packet's header data and included in the notification tag.

The source identifier 100 also included in the notification tag indicates an ingress port on which the packet was received. The source identifier may also be obtained from the packet's header data.

The PBN field 98 includes a reference to a memory location in the PBU 16 that is selected to store the packet. Unlike the other fields of the notification tag, the PBN field 98 is filled by the PBU 16 once such a memory location is identified.

Figure 4:
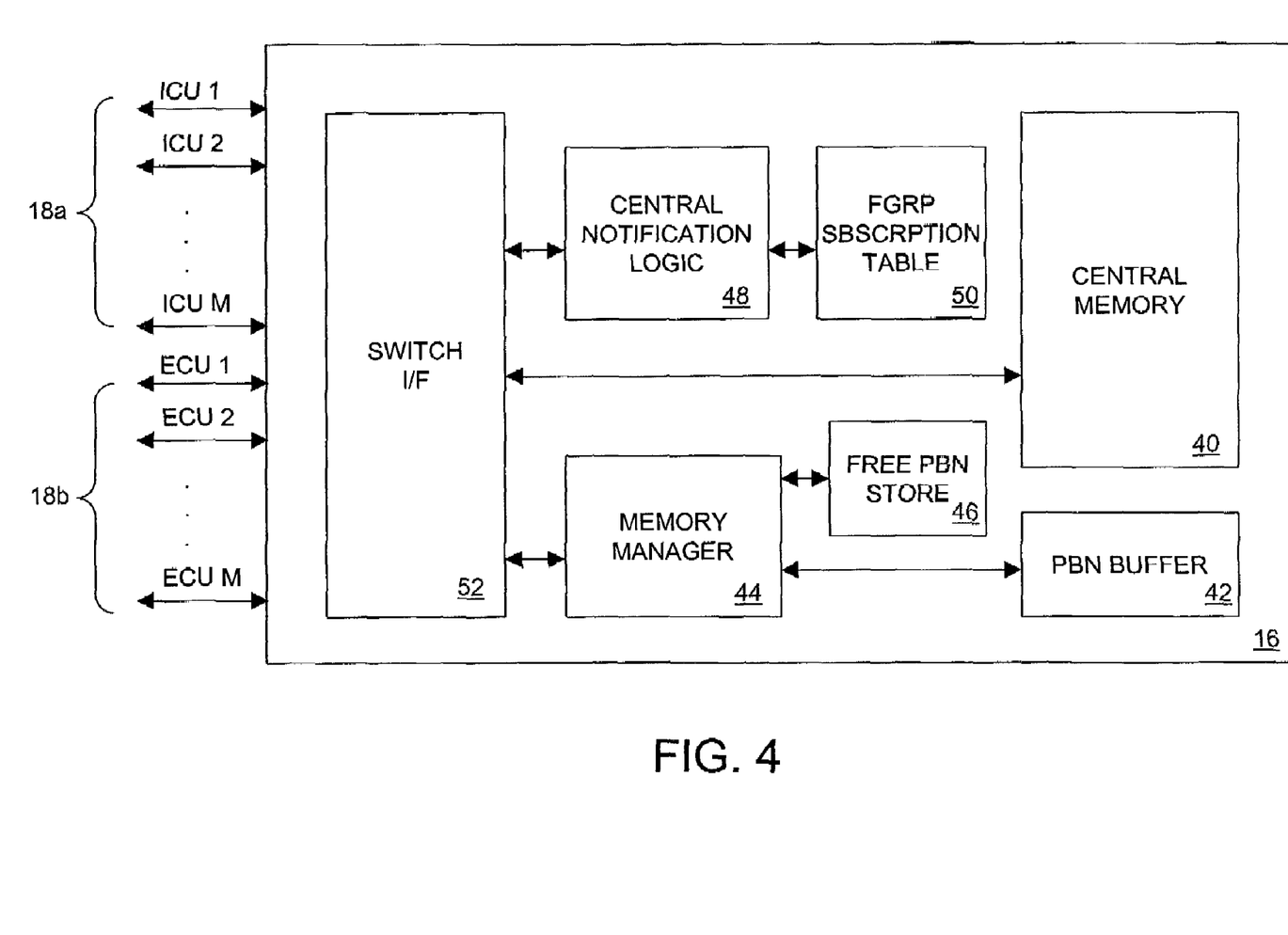
FIG. 4 is a schematic block diagram of an exemplary packet buffer unit according to one embodiment of the invention.

FIG. 4 is a schematic block diagram of an exemplary PBU 16 according to one embodiment of the invention. The PBU in the illustrated embodiment includes a central memory 40 for storing packets received from the ICUs 10.

The PBU 16 further includes a PBN buffer 42 which may be implemented as a dynamic random access memory (DRAM) or a static RAM (SRAM). Each entry in the PBN buffer 42 includes an address, referred to as a PBN address, of a pointer to the central memory 40 where at least a portion of the packet is stored. According to one embodiment of the invention, the PBN address is the address of a first pointer of a linked list of pointers to memory locations where different portions of the packet are stored.

Each PBN address stored in the PBU buffer 42 is associated with a plurality of booking bits reflective of the links 18b and their corresponding ECUs that have locally queued a reference to the PBN address in a corresponding queue and have indicated, via a booking action, an interest in receiving the packet associated with the PBN address. Each booking bit may also optionally be associated with a booking count indicative of the number of bookings received for the PBN address.

The PBN buffer 42 is coupled to a memory manager 44 which controls the free memory space in the central memory 40, assigns the free memory space to new packets that need to be stored in the central memory, and assists in the retrieval of packets from the central memory. A free PBN store 46 is used for maintaining track of free memory locations that may be allocated to new incoming packets.

The PBU 16 also includes a central notification logic 48 coupled to a flow group (FGRP) subscription table 50. The FGRP subscription table 50 indicates, for each particular flow group, an ECU that has subscribed to the flow group. According to one embodiment, the central notification logic 48 determines the flow group associated with the incoming packet and transmits notifications to ECUs that have subscribed to that flow group and would therefore be interested in receiving the packet. According to one embodiment of the invention, the notifications are all or a portion of the notification tag appended to the incoming packet.

The PBU 16 further includes a switch interface 52 communicating with the ICUs 10 and ECUs 12 via the high speed serial links 18a, 18b. The switch interface 52 receives different types of packets from the ICUs 10 and ECUs 12, and separates the different types of packets for forwarding to the appropriate components within the PBU.

For example, the switch interface 52 receives from the ICUs 10 inbound packets with notification tags. The notification tags are stripped off of the data packets and transmitted to the central notification logic 48 for completing the PBN field 98 and for transmitting all or a portion of the notification tag as a notification message to the appropriate ECUs 12. The data portion of the packet is transmitted to the central memory 40 for storage.

The switch interface 52 further receives booking messages and packet request messages from the ECUs 12 which are forwarded to the memory manager 44 for booking or retrieving packets for the ECUs. The switch interface 52 also receives subscription and unsubscription messages for subscribing and unsubscribing to particular flow groups. The subscription and unsubscription messages are transmitted to the central notification logic 48 for updating the FGRP subscription table 50.

Figure 5:
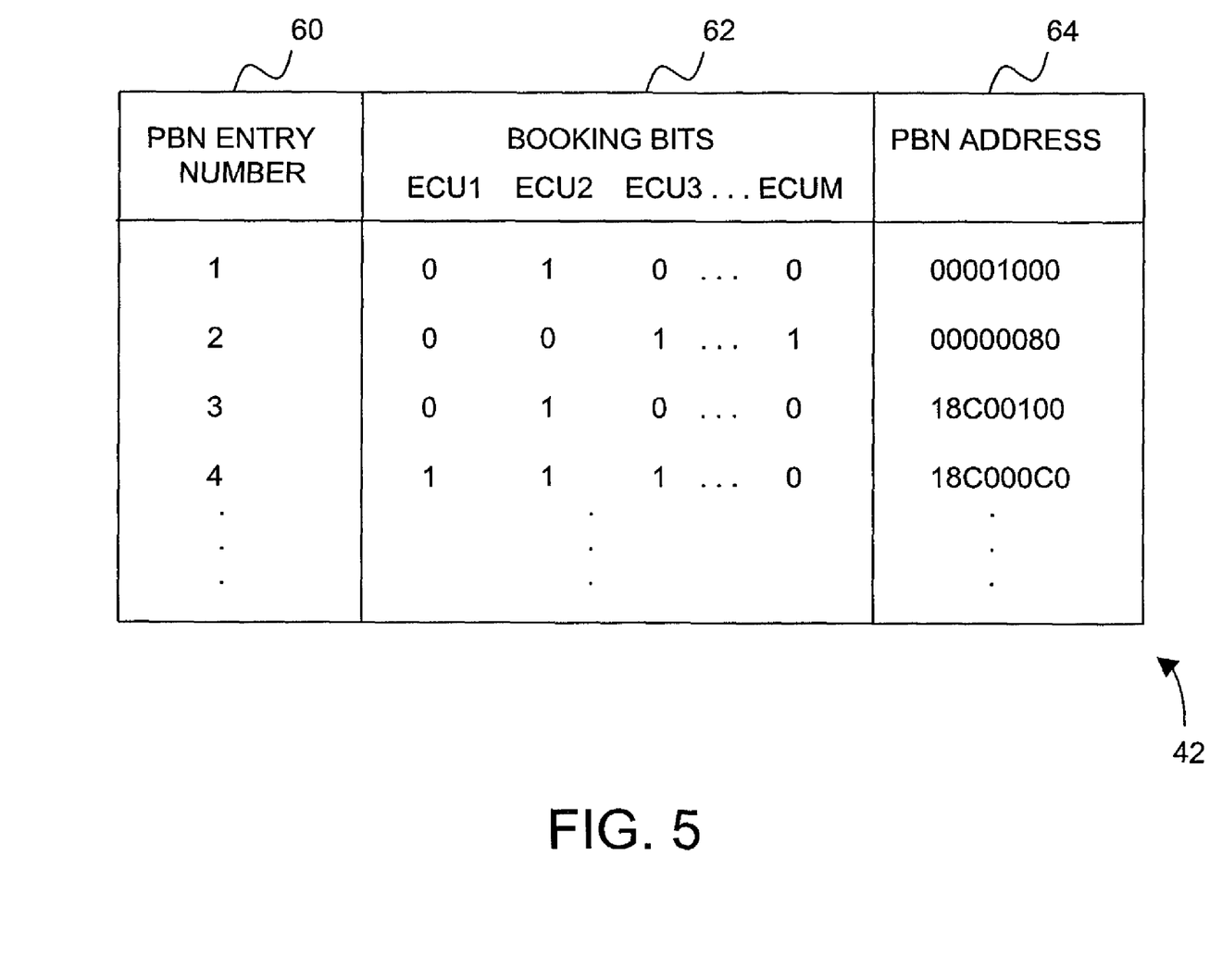
FIG. 5 is a schematic layout diagram of a PBN buffer in the packet buffer unit of FIG. 4 according to one embodiment of the invention.

FIG. 5 is a schematic layout diagram of the PBN buffer 42 according to one embodiment of the invention. The PBN buffer includes a plurality of entries where each entry includes a PBN entry number 60, a plurality of associated booking bits 62, and a PBN address 64. A new entry is added to the PBN buffer by the memory manager when a new packet is stored in the central memory 40.

The PBN entry number 60 (also referred to as a reference to the PBN) is used as a reference to the booking bits 62 and associated PBN address 64. According to one embodiment, the PBN entry number 60 is stored in the PBN field 98 of a notification tag 92.

The PBN address 64 (also referenced simply as the PBN) is a start address of a linked list of pointers to memory locations storing different portions of a particular packet.

The booking bits 62 indicate the ECUs 12 that have booked a packet by queuing the associated PBN entry number in an egress queue. According to one embodiment, each booking bit is associated with a particular ECU. Each bit is set upon receipt of a booking message from the corresponding ECU and each bit is unset upon receipt of a packet request message from its ECU with a release bit indication.

Figure 6:
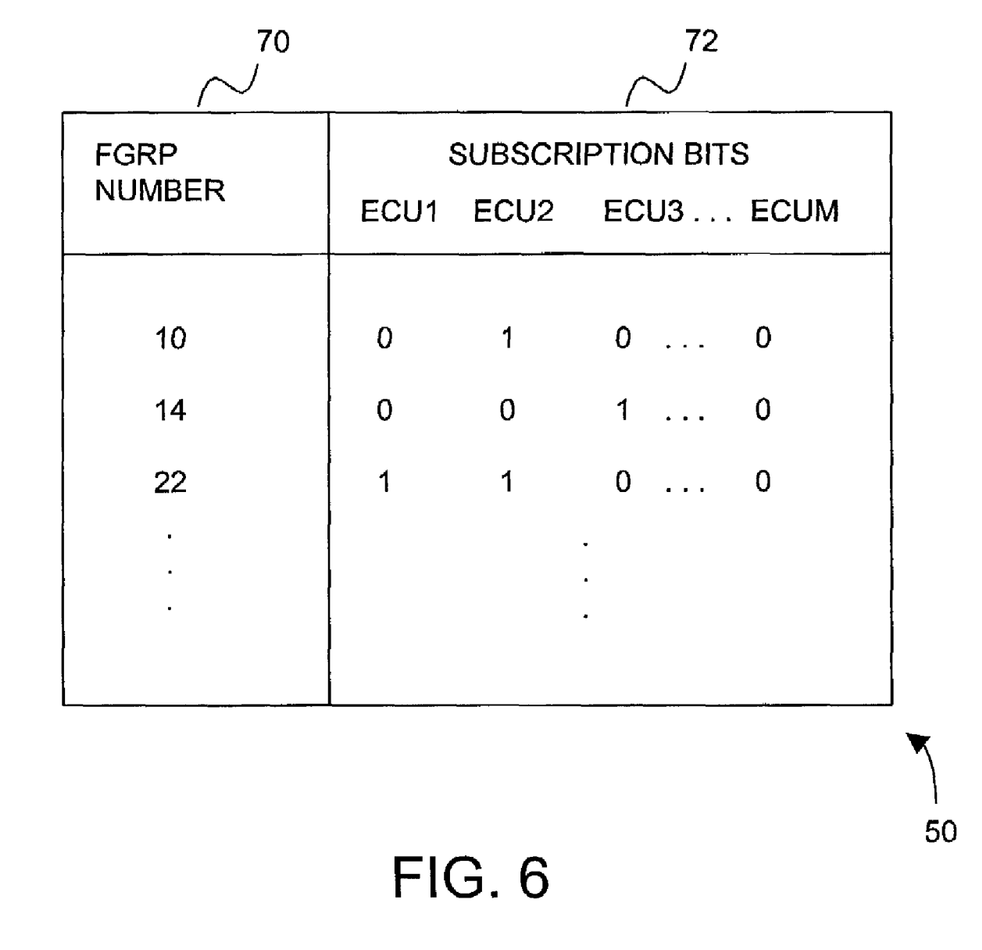
FIG. 6 is a schematic layout diagram of a FGRP subscription table resident in the packet buffer unit of FIG. 4 according to one embodiment of the invention.

FIG. 6 is a schematic layout diagram of the FGRP subscription table 50 resident in each PBU according to one embodiment of the invention. The table preferably includes a flow group number 70, or any other type of identifier, and a plurality of subscription bits 72 indicative of the ECUs 12 that have subscribed to the group. According to one embodiment of the invention, each subscription bit is associated with a particular ECU. Each bit is set upon receipt of a subscription message from the corresponding ECU, and each bit is unset upon receipt of an unsubscription message from its corresponding ECU. The subscription information in the FGRP subscription table 50 is used for determining the ECUs subscribing to the flow group indicated in an inbound packet that may be interested in receiving the packet and are hence to receive a notification message from the PBU. Subscription and unsubscription to particular flow groups may be done in hardware or in software.

Figure 7:
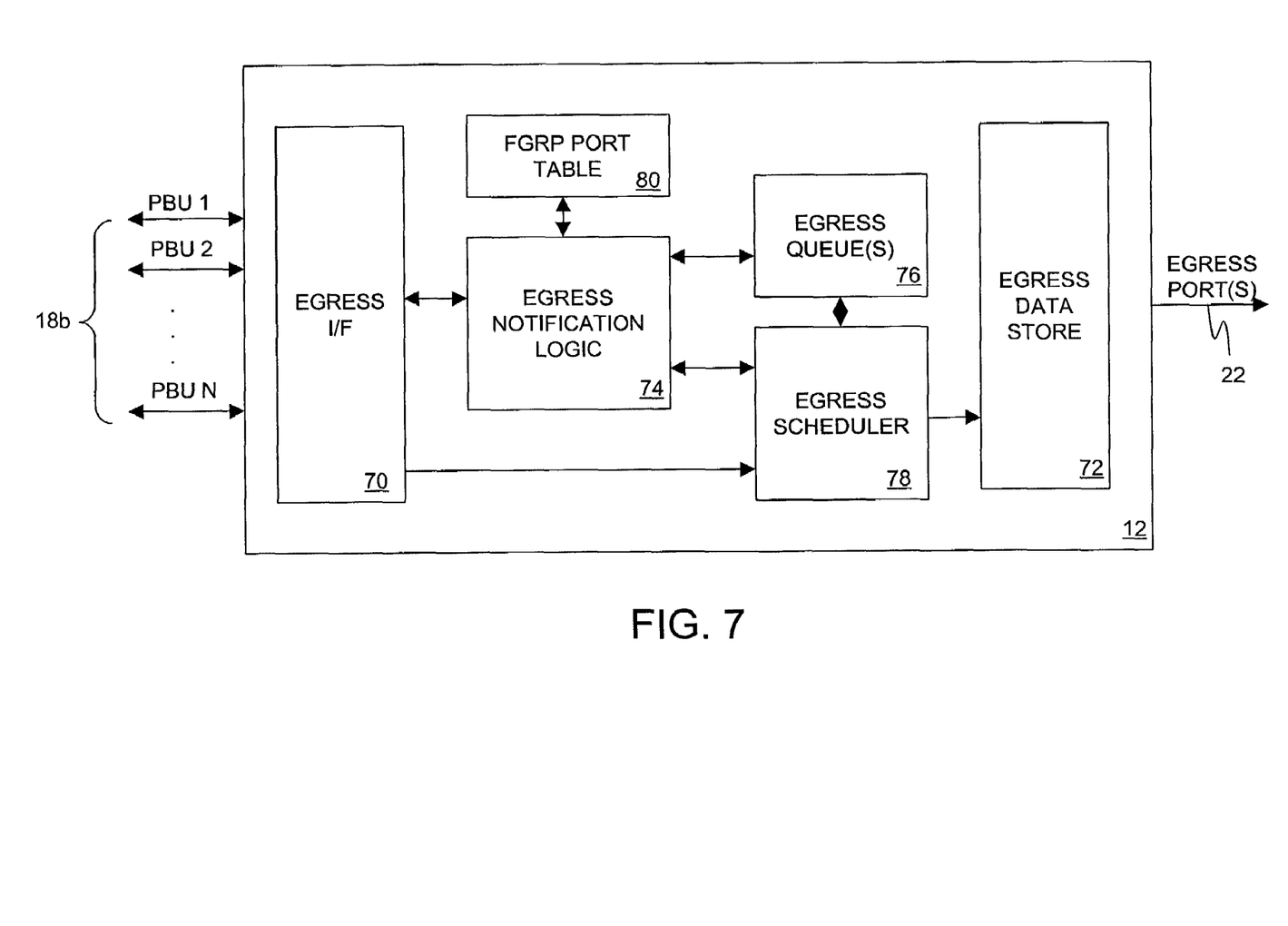
FIG. 7 is a schematic block diagram of an exemplary egress control unit according to one embodiment of the invention.

FIG. 7 is a schematic block diagram of an exemplary ECU 12 according to one embodiment of the invention. According to the illustrated embodiment, the ECU 12 includes an egress interface 70 communicating with the PBUs 16 over the high speed serial links 18b. The egress interface 70 receives different types of packets from the PBUs, and processes and forwards those packets to the appropriate egress components.

According to one embodiment of the invention, the egress interface 70 transmits data packets retrieved from the PBUs to an egress data store 72 for temporarily storing the packet prior to forwarding over one or more egress ports 22. The egress data store 72 may be implemented as a first-in-first-out (FIFO) buffer. The egress data store 72 may be desirable if the data rate of one or more of the egress ports 22 is lower or higher than the data rate of the high speed serial links 18b from the PBUs. An embodiment may exist, however, where the ECU 12 does not include an egress data store 72.

The egress interface 70 further receives notification message packets from the PBUs 16 and forwards them to an egress notification logic 74. According to one embodiment of the invention, the notification message is the notification tag appended to a packet received by a PBU. In response, the egress notification logic 74 determines whether to book or discard a packet associated with a notification message. In this regard, the egress notification logic 74 determines the egress ports 22 that are to forward the packet based on the flow group number transmitted with the notification message. The egress notification logic 74 queries a FGRP port table 80 with the flow group information and determines the one or more egress ports 22 that are associated with the indicated flow group.

The egress notification logic 74 determines the queue levels of the egress queues 76 associated with the subscribed ports. If the queue levels are too high, as determined based on a congestion control algorithm currently being utilized, the notification is discarded.

Otherwise, if the packet may be enqueued, the egress notification logic 74 enqueues the reference to the PBN transmitted in the notification message in an egress queue 76 that is selected based on the flow group field 94 and the priority field 96 of the notification message. The egress notification logic 74 further transmits a booking message to the PBU 16 that transmitted the notification message, indicating that the reference to the PBN was enqueued. According to one embodiment, the booking message includes at least the reference to the PBN uniquely identifying the packet to be booked The ECU transmits a single booking request even if more than one egress port is subscribed to the flow group indicated in the FGRP field 94. The PBU can however receive multiple booking requests for the same PBN if the packet is to be transmitted by several ECUs.

The ECU 12 includes an egress scheduler 78 that dequeues the reference PBNs from each egress queue 76 according to a particular scheduling algorithm, such as, for example, a weighted round robin algorithm, class based dequeuing, or the like. When a packet associated with an enqueued reference to a PBN is scheduled to be forwarded as determined by the scheduling mechanism, the egress notification logic 74 transmits a packet request message to the PBU. According to one embodiment, the packet request message includes the reference to the PBN and a release bit. If set, the release bit indicates that the request is a last request for the packet, allowing the booking bit for the packet to be cleared. The packet indicated in the request message is retrieved by the PBU and transmitted to the requesting ECU. The packet is then forwarded via one or more appropriate egress ports.

Figure 8:
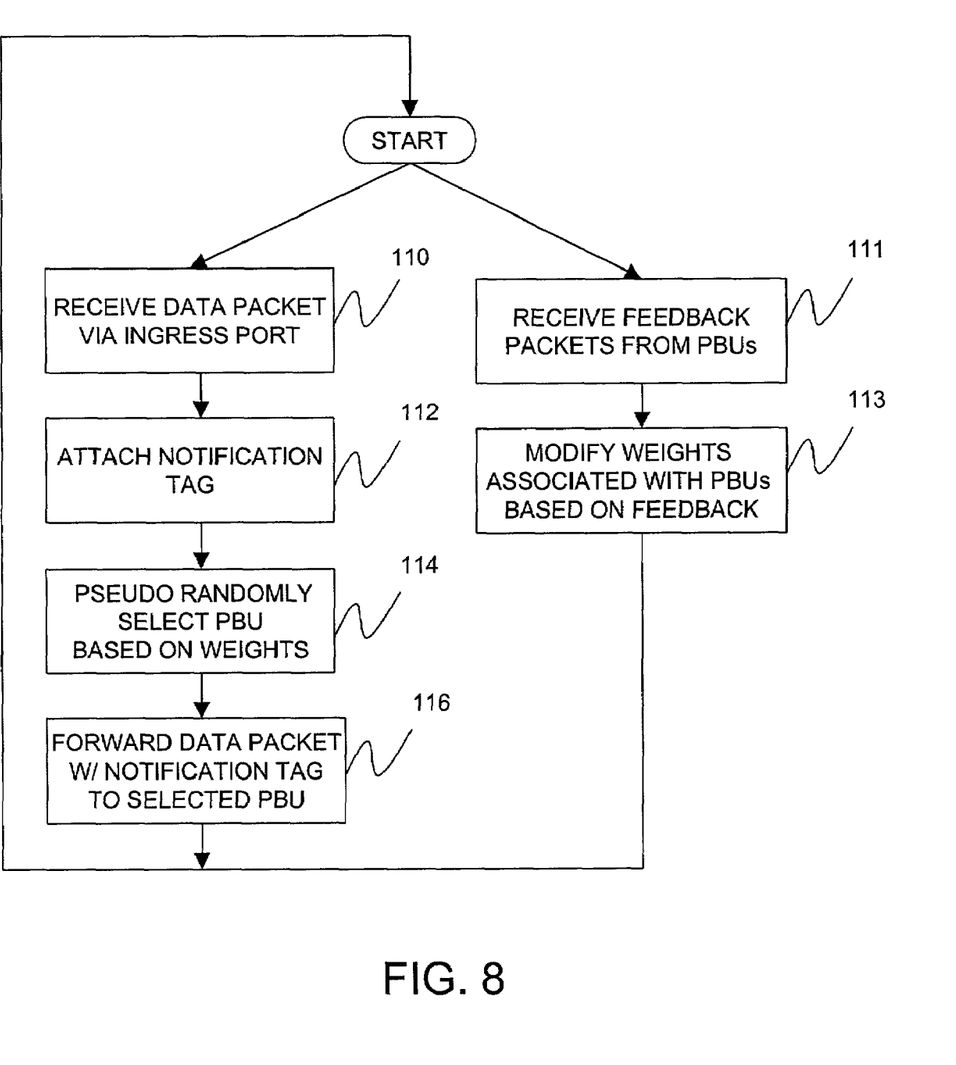
FIG. 8 is a process flow diagram illustrating the processing steps performed by the ingress control unit of FIG. 2 according to one embodiment of the invention.

FIG. 8 is a process flow diagram illustrating the processing steps performed by the exemplary ICU 10 of FIG. 2 according to one embodiment of the invention. The process starts, and in step 110, the ingress port 20 receives an inbound data packet. In step 112, the ingress processor 32 generates a notification tag and attaches the tag to the packet. In step 114, the ingress processor selects a PBU 16 based on a pseudo random algorithm that is conventional in the art, adjusted by the weight associated with each PBU. In step 116, the ICU forwards the data packet with the notification tag to the selected PBU.

The ICU 10 further receives feedback packets from the PBUs 16 via either their associated high speed serial links or 18a or a separate control link (not shown). According to one embodiment, the feedback packets indicate the load of the transmitting PBUs. The load information is used, in step 113, to modify the weight associated with each PBU which is used in determining a PBU that is to receive a next incoming packet.

Figure 9:
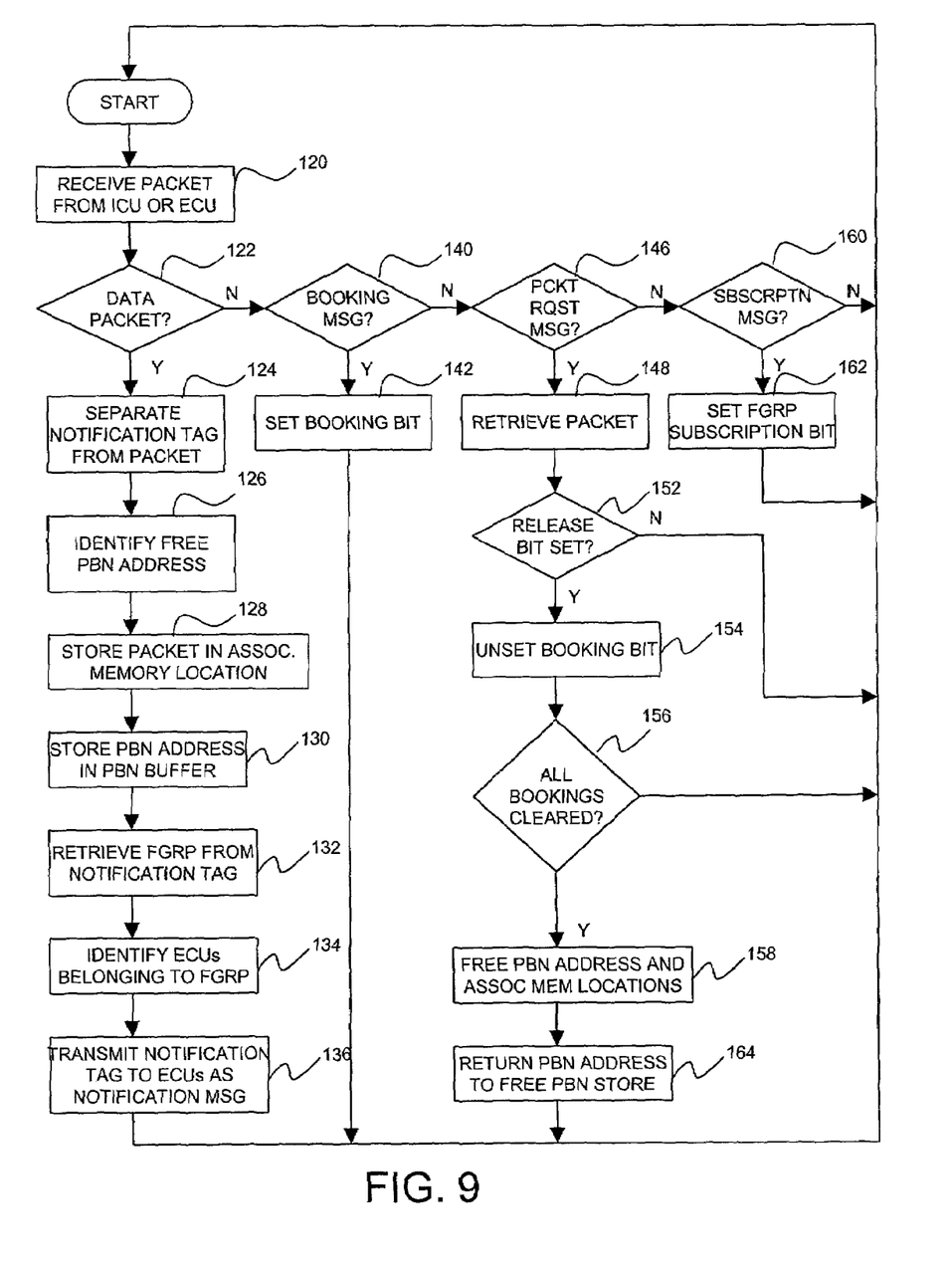
FIG. 9 is a process flow diagram illustrating the processing steps performed by the packet buffer unit of FIG. 4 according to one embodiment of the invention.

FIG. 9 is a process flow diagram illustrating the processing steps performed by the PBU 16 of FIG. 4 according to one embodiment of the invention. The process starts, and in step 120, the PBU receives a packet transmitted by an ICU or ECU. In step 122, a determination is made as to whether the packet is a data packet transmitted by an ICU. If the packet is a data packet, the notification tag appended to the packet is removed in step 124 by the switch interface 52. The notification tag is transmitted to the central notification logic 48 and the data packet transmitted to the memory manager 44.

In steps 126 and 128, the memory manager 44 queries the free PBN store 46 for a PBN address to an available memory location and stores all or a portion of the packet in the memory location. A linked list of pointers to memory locations is generated based on the PBN address and any remaining portion of the packet is stored in the memory locations. In step 130, the PBN address is stored in the PBN buffer 42.

The central notification logic 48 then proceeds to transmit notifications of the newly arrived packet to the ECUs 12 that have subscribed to the flow group indicated by the packet's notification tag. In this regard, the central notification logic 48, in step 132, retrieves a flow group number from the notification tag. In step 134, the central notification logic 48 queries the FGRP subscription table 50 and identifies the ECUs belonging to the indicated flow group. In step 136, the central notification logic 48 proceeds to transmit the notification tag to the identified ECUs as a notification message.

Referring now to step 140, if a received packet is a booking message from an ECU indicating that the PBU is to maintain a packet in memory until requested by the ECU, the booking message is forwarded to the memory manager 44. The memory manager determines the ECU transmitting the message and the PBN entry number of the packet to be booked. In step 142, the booking bit for the corresponding PBN entry number and ECU is set in the PBN buffer 42.

If the received packet is a packet request message from an ECU, as determined in step 146, the packet is forwarded to the memory manager 44. The memory manager 44 retrieves a PBN address based on the PBN entry number indicated in the message and uses the PBN address as a start address of a linked list of pointers to memory locations and retrieves, in step 148, the contents stored in the memory locations.

The memory manager further determines, in step 152, whether a release bit is set in the packet request message. If the answer is YES, no other packet requests are expected from this particular ECU and the booking bit associated with the PBN for the ECU is unset in step 154.

In step 156, a determination is made as to whether all the booking bits are cleared. If the answer is YES, no other requests are expected for the packet and the PBN address and associated memory locations are freed in step 158. The freed PBN is further returned to the free PBN store in step 164.

In an alternative embodiment, instead of a release bit for clearing booking bits and freeing memory locations, a booking count is maintained for each PBN entry which increases upon receipt of a booking message and decreases upon receipt of a packet request message for the particular PBN entry. When the booking count reaches 0, the memory locations associated with the PBN address are freed.

Referring now to step 160, if the received packet is a subscription message, the message is relayed to the central notification logic 48 which retrieves a flow group number from the message. The central notification logic then proceeds to set the transmitting control unit's subscription bit for the indicated flow group.

Figure 10:
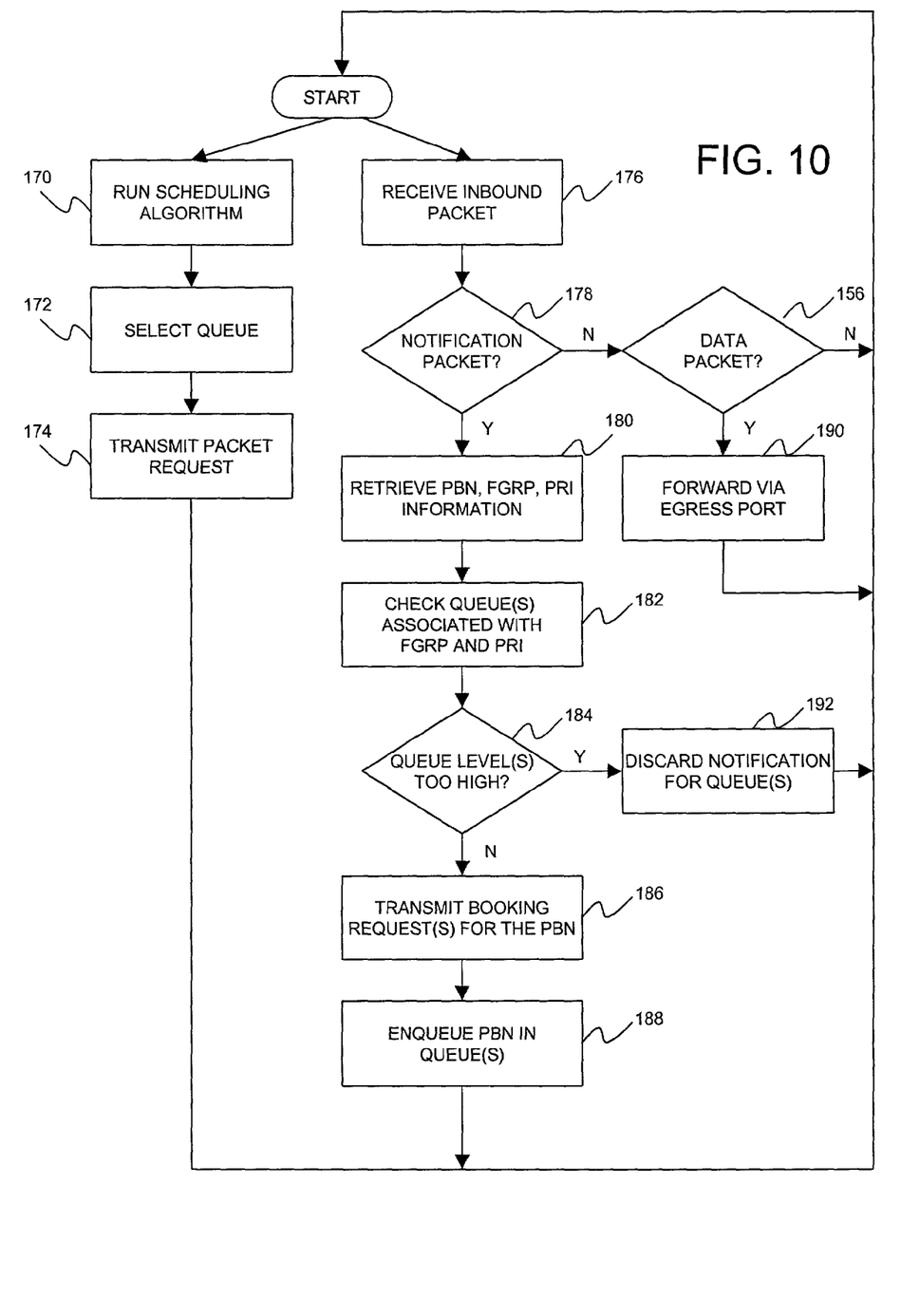
FIG. 10 is a process flow diagram illustrating the processing steps performed by the egress control unit of FIG. 7 according to one embodiment of the invention.

FIG. 10 is a process flow diagram illustrating the processing steps performed by the ECU 12 of FIG. 7 according to one embodiment of the invention. The process starts, and in step 170, the egress scheduler 78 runs a scheduling algorithm for forwarding packets via its egress port(s) 22. In step 172, the egress scheduler 78 selects a queue based on the scheduling algorithm and in step 174, transmits a packet request for the queue.

In step 176, the ECU 12 receives an inbound packet and a determination is made in steps 178 and 156 as to whether the packet is a notification packet or a data packet. If the packet is a data packet requested by the ECU, the packet is forwarded to a destination in step 190 via an egress port 22.

If the packet is a notification packet, it is forwarded to the egress notification logic 74 which, in step 180, retrieves from the notification the PBN entry number, flow group number, and priority information. In step 182, the egress notification logic queries the flow group port table 80 and identifies one or more egress queues 76 associated with the indicated flow group and priority. In step 184, a determination is made as to whether the filling level of the identified queues are too high. If the answer is YES, the notification is discarded for each queue for which filling level is too high.

If the answer is NO for at least one queue, a booking request for booking the packet associated with the PBN entry number is transmitted, in step 186, for the identified queue(s). In step 188, the PBN entry number is enqueued in each queue for which the filling level permitted the queuing.

Although this invention has been described in certain specific embodiments, those skilled in the art will have no difficulty devising variations which in no way depart from the scope and spirit of the present invention. It is therefore to be understood that this invention may be practiced otherwise than is specifically described. Thus, the present embodiments of the invention should be considered in all respects as illustrative and not restrictive, the scope of the invention to be indicated by the appended claims and their equivalents rather than the foregoing description.

What is claimed is:

1. A packet switching system including a plurality of ingress control units, a plurality of egress control units, and a switch fabric coupled to the plurality of ingress control units and the plurality of egress control units, characterized in that packets received by the plurality of ingress control units are stored in the switching fabric, and each egress control unit identifies and requests from the switch fabric a packet destined for the egress control unit according to its respective scheduling algorithm, the switch fabric retrieving and transmitting the requested packet to the requesting egress control unit for forwarding the packet to a destination, the switch fabric transmits a notification message to one or more egress control units, the notification message including address information that may be used for retrieving at least a portion of a stored packet, and further characterized in that each of the egress control units receiving the notification message determines, based on a filling level of its respective queue, whether to discard the notification message or store in the queue the address information included in the notification message.

2. The packet switching system of claim 1, wherein the switch fabric includes a plurality of storage units each having a memory for storing the packets received from the plurality of ingress control units.

3. The packet switching system of claim 2, further characterized in that each ingress control unit selects one of the plurality of storage units for storing a packet based on a pseudo random algorithm.

4. The packet switching system of claim 3, wherein the pseudo random algorithm is modified based on load information of each storage unit.

5. The packet switching system of claim 1, further characterized in an egress control unit storing the address information in the queue transmits to the switch fabric a booking message for indicating that it is to request the stored packet in the future.

6. The packet switching system of claim 1, further characterized in that an egress control unit storing the address information in its queue transmits to the switch fabric a request message to retrieve the stored packet.

7. The packet switching system of claim 6, wherein the switch fabric releases a memory location associated with the stored packet if no more request messages are to be transmitted by the egress control unit to retrieve the stored packet.

8. The packet switching system of claim 1, wherein content of the notification message is based on tag data associated with the stored packet.

9. The packet switching system of claim 8, wherein the tag data includes a group indicia indicative of a group of egress control units that are to receive the notification message.

10. The packet switching system of claim 8, wherein the one or more egress control units transmit a subscription message including the group indicia to the switch fabric for allowing the switch fabric to associate the one or more egress control units with the group indicia.

11. The packet switching system of claim 1, wherein the switch fabric is a shared memory switch fabric.

12. A method for transmitting packets via a packet switching system including a plurality of ingress control units, a plurality of egress control units, and a switch fabric coupled to the plurality of ingress and egress control units, the method comprising:

receiving a packet via one of the ingress control units;

storing the packet in the switch fabric;

transmitting via the switch fabric a notification message to one or more egress control units, the notification message including an address information associated with the stored packet;

receiving at the switch fabric a request message transmitted by the one or more egress control units, the request message including the address information;

retrieving the packet based on the address information; and transmitting the retrieved packet to each requesting egress control unit; and determining, based on a filling level of a queue in each receiving egress control unit, whether to discard the notification message or store in the queue the address information included in the notification message.

13. The method of claim 12, wherein the switch fabric includes a plurality of storage units each having a memory, and the method further comprises selecting based on a pseudo random algorithm one of the plurality of storage units for storing the packet in its associated memory.

14. The method of claim 13, wherein the pseudo random algorithm is modified based on load information of each storage unit.

15. The method of claim 12 further comprising transmitting to the switch fabric a booking message for indicating that an egress control unit transmitting the booking message is to request the stored packet in the future.

16. The method of claim 12 further comprising releasing a memory location associated with the stored packet if no more request messages are to be transmitted by the egress control unit to retrieve the stored packet.

17. The method of claim 12, wherein content of the notification message is based on tag data associated with the stored packet.

18. The method of claim 17, wherein the tag data includes a group indicia and the method further comprises identifying at the switch fabric the one or more egress control units associated with the group indicia for transmitting the notification message.

19. The method of claim 18 further comprising transmitting to the switch fabric a subscription message including the group indicia for allowing the switch fabric to associate the one or more egress control units with the group indicia.

20. The method of claim 12, wherein the switch fabric is a shared memory switch fabric.

* * * * *